(12) United States Patent
Gotthardt

(10) Patent No.: US 9,165,149 B2
(45) Date of Patent: Oct. 20, 2015

(54) USE OF A MOBILE TELECOMMUNICATION DEVICE AS AN ELECTRONIC HEALTH INSURANCE CARD

(75) Inventor: Frank Gotthardt, Eitelborn (DE)

(73) Assignee: COMPUGROUP MEDICAL AG, Koblenz (DE)

( * ) Notice: Subject to any disclaimer, the term of this patent is extended or adjusted under 35 U.S.C. 154(b) by 282 days.

(21) Appl. No.: 12/934,882

(22) PCT Filed: Feb. 16, 2009

(86) PCT No.: PCT/EP2009/051818
§ 371 (c)(1),
(2), (4) Date: Jan. 26, 2011

(87) PCT Pub. No.: WO2009/121658
PCT Pub. Date: Oct. 8, 2009

(65) Prior Publication Data
US 2011/0123027 A1      May 26, 2011

(30) Foreign Application Priority Data
Mar. 31, 2008   (DE) .......................... 10 2008 000 895

(51) Int. Cl.
*H04K 1/00* (2006.01)
*G06F 21/62* (2013.01)
*G06F 21/60* (2013.01)

(52) U.S. Cl.
CPC .......... *G06F 21/6209* (2013.01); *G06F 21/606* (2013.01)

(58) Field of Classification Search
CPC ............................... H04W 12/02; H04W 12/06
USPC ........................................................ 380/270
See application file for complete search history.

(56) References Cited

U.S. PATENT DOCUMENTS

| 2002/0010679 | A1* | 1/2002 | Felsher ........................... 705/51 |
| 2002/0103765 | A1* | 8/2002 | Ohmori ........................... 705/67 |
| 2005/0163320 | A1* | 7/2005 | Brown et al. ................. 380/270 |
| 2005/0273604 | A1 | 12/2005 | Lai |

FOREIGN PATENT DOCUMENTS

| DE | 10323904 A1 | 12/2004 |
| DE | 102004051296 B3 | 5/2006 |

(Continued)

OTHER PUBLICATIONS

Von Grätz, P., "Cellular Telephone Instead of a Health Card—Physicians May Soon Have this Alternative When Making House Calls," Medical Journal: Arzte Zeitung, Aug. 11, 2005, URL: <<http://www.aerztezeitung.de>>, 4 pages.

*Primary Examiner* — Anthony Brown

(57) ABSTRACT

The invention relates to a method for decoding a medicinal data object (132) by means of a data processing system (100). The medicinal data object is encoded by means of a data object key, a signature is allocated to said data object key and the data object key is encoded by means of a first health insurance card key (138). Said medicinal data object is allocated to the first health insurance card key (138) and said method comprises the following steps: a secure communication channel is established with the mobile telecommunication device (116), the telecommunication device (116) is designed to be used as an electronic health insurance card, the first health insurance card key (138) is allocated to the mobile telecommunication device (116), the data object key coded by the health insurance card key (138) is sent to the telecommunication device (116), the decoded data object key is captured by the telecommunication device (116), and the medicinal data object (132) is decoded by the coded data object key.

15 Claims, 5 Drawing Sheets

(56) References Cited

FOREIGN PATENT DOCUMENTS

Figure 1:
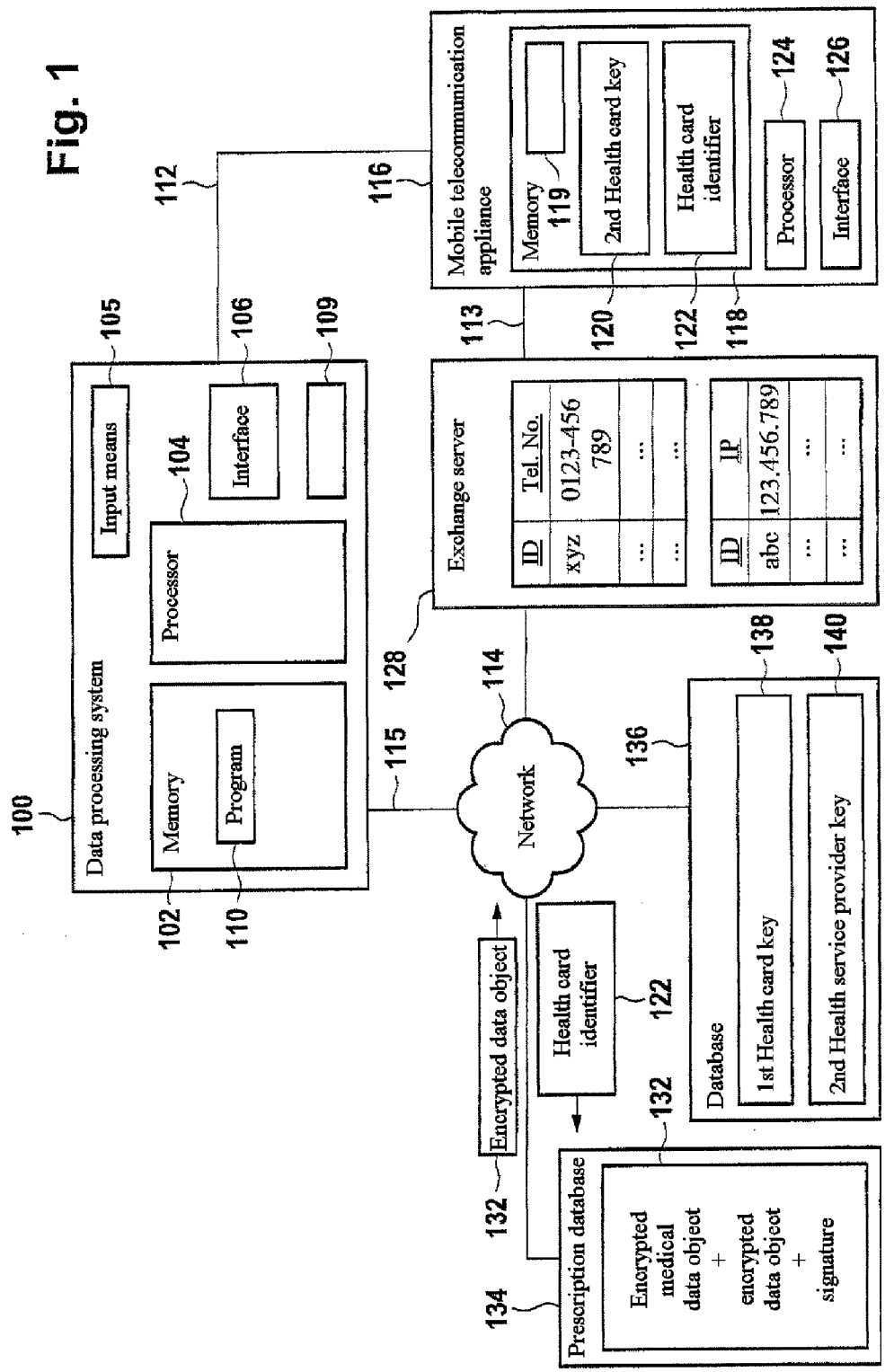

| | | |
|---|---|---|
| DE | 102005009051 A1 | 9/2006 |
| DE | 102006057201 A1 | 6/2008 |
| EP | 1528752 A2 | 5/2005 |
| WO | WO9914652 A1 | 3/1999 |

* cited by examiner

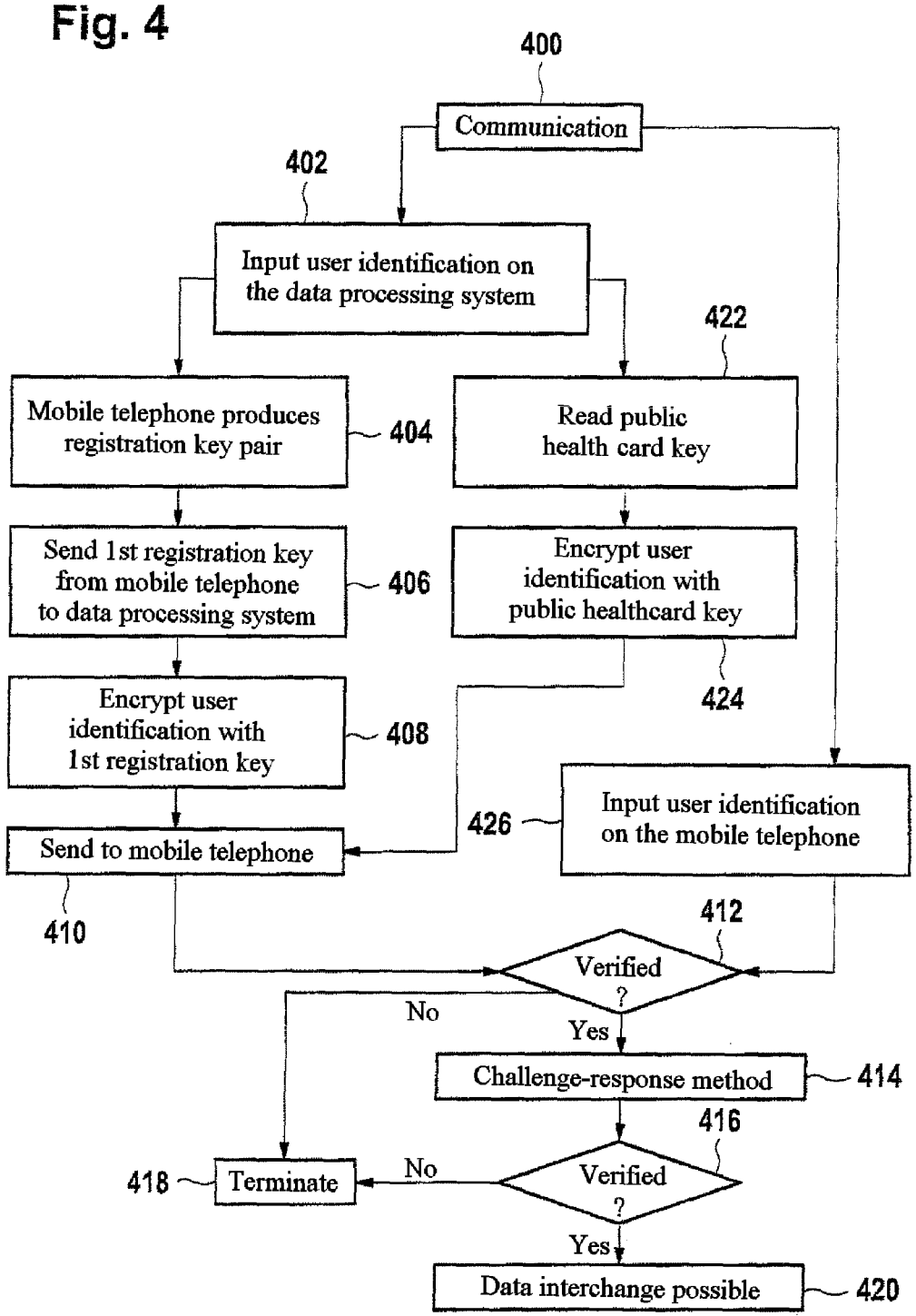

USE OF A MOBILE TELECOMMUNICATION DEVICE AS AN ELECTRONIC HEALTH INSURANCE CARD

The invention relates to a method for the decryption of a medical data object by a data processing system, a method for the decryption of an encrypted data object key, wherein the decryption is performed by a mobile telecommunication appliance, and to a data processing system, a mobile telecommunication appliance and appropriate computer program products for carrying out the methods according to the invention.

The electronic health card, eGK for short, is intended to replace the health insurance card in Germany from the beginning of 2006. The aim here is to reduce the cost of, simplify and speed up data transmission between medical service providers, medical insurance companies, pharmacies and patients in the future. This also includes, inter alia, allowing access to an electronic doctor's letter, an electronic medical record and the electronic prescription using the electronic health card. The electronic health card stores only a certain portion of obligatory details on account of the small amount of memory space available thereon. By way of example, details relating to the identity of the patient, relating to the emergency service and optionally also notes, e.g. regarding the patient's organ donor status, are stored on the card. Access to documentation relating to medicaments taken, the electronic doctor's letter, the electronic medical record and the electronic prescription is effected via secured access nodes to specialized services in the telematics infrastructure.

An important aspect in the use of electronic prescriptions, for example, is the security of the use of such prescriptions in order both to prevent unauthorized spying-out of prescription data and to prevent prescriptions from being issued abusively. This is done using the electronic signature, for example, which is produced by a treating doctor using his healthcare professional ID.

In order to prevent the very misuse of electronic prescription data, however, further encryption thereof is required in order to prevent unauthorized access by third parties. The following procedure lends itself to this: when the electronic prescription is issued by the treating doctor, the doctor information system produces a symmetric random key, for example, which is used to encrypt the electronic prescription. The public key of the patient, also called the public electronic health card key, is then used to encrypt the symmetric key. The prescription encrypted in this manner can now be stored on a server, which contains a central prescription database, together with the encrypted symmetric key and the prescription signature, which, as described above, has been produced using the healthcare professional ID of the doctor.

In order to now access the prescription in a pharmacy, for example, an explicit patient identifier, which is read from the electronic health card in secured fashion, for example can be used to access the encrypted electronic prescription and to load the encrypted electronic prescription, the encrypted symmetric key and the signature from the prescription database onto the relevant pharmacy information system. In this case, it should be noted that self-evidently the signature can be downloaded as a separate file, or it is alternatively possible for the electronic prescription to be encrypted together with the signature, so that only a single encrypted file is obtained in this context. In this case, only this single encrypted file needs to be downloaded together with the encrypted symmetric key.

After the patient has now introduced his electronic health card into an appropriate reader in the pharmacy information system, has identified himself and is authorized to redeem the electronic prescription, the symmetric key encrypted with the public patient key is transmitted to the electronic health card. The electronic health card stores a non-readable private patient key which can be used to decrypt the encrypted key. Preferably, the private patient key and the public patient key form a cryptographic asymmetric key pair in this.

After the symmetric key has been decrypted, the pharmacy information system can use the decrypted symmetric key to decrypt the electronic prescription. In addition, there is also a need for authenticity verification of the signature which the doctor has produced for the relevant electronic prescription.

A drawback of the electronic health card is that it is a chip card, an average patient already carrying a large number of different chip cards with him continually anyway. These include, inter alia, credit cards, IDs in check card format, cash cards, etc. This firstly increases the risks of losing the electronic health card. Secondly, it reduces willingness to also continually carry the electronic health card in addition, since usually the average patient needs to use the electronic health card only at very irregular intervals.

In light of this, the invention is based on the object of providing an improved method for the decryption of a medical data object by a data processing system, a data processing system, an improved method for the decryption of an encrypted data object, a mobile telecommunication appliance, and appropriate improved computer program products.

The objects on which the invention is based are respectively achieved by means of the features of the independent patent claims. Preferred embodiments of the invention are specified in the dependent patent claims.

The invention provides a method for the decryption of a medical data object by a data processing system, wherein the medical data object is encrypted with a data object key, wherein the medical data object has, associated with it, a signature and the data object key encrypted with a first health card key, wherein the medical data object is associated with the first health card key. In this case, the method comprises the step of setting up a secure communication channel to a mobile telecommunication appliance, wherein the mobile telecommunication appliance is designed for use as an electronic health card, wherein the first health card key is associated with the mobile telecommunication appliance. The data object key encrypted with the first health card key is then sent to the telecommunication appliance, and then the decrypted data object key is received from the telecommunication appliance in response to the previously effected sending. Finally, in a last step, the medical data object is decrypted with the decrypted data object key.

The method according to the invention for the decryption of a medical data object by a data processing system, e.g. a pharmacy information system, has the advantage that a patient no longer needs to carry an electronic health card with him as a separate chip card. All that is required here is the use of a commercially available mobile telecommunication appliance, such as a mobile telephone, a PDA (personal digital assistant) with a built-in radio interface, etc., as the electronic health card. Since a patient usually carries a mobile telephone with him continually today, this will significantly increase the acceptance of the electronic health card. Furthermore, the probability of the patient carrying the electronic health card with him in most situations is significantly increased: in the case of an emergency, for example, the probability of the patient carrying his mobile telephone with him at this instant is thus substantially higher than would be the case if an electronic health card were used as a chip card in check card format.

In addition, the use of the steps of the method in order to decrypt a medical data object ensures the necessary certainty that only a holder of the health card integrated in the mobile telecommunication appliance is able to access the prescription data. Hence, unauthorized spying-out of the prescription data while they are located on an appropriate prescription server is reliably prevented.

In accordance with one embodiment of the invention, the method also comprises the step of a signature check, wherein the medical data object is released only when the signature for the medical data object has been verified. By way of example, the signature may be formed by an encrypted hash value for the medical data object, wherein the hash value is encrypted with a first health service provider key, wherein the signature check in this case comprises the steps of retrieving a second health service provider key associated with the first health service provider key, decrypting the signature with the second health service provider key and calculating a hash value for the medical data object, wherein the medical data object is verified when the hash value of the medical data object corresponds to the decrypted signature. By way of example, the first and second health service provider keys are the private and public keys of the doctor, which are linked to the latter's healthcare professional ID.

In accordance with one embodiment of the invention, the first health service provider key and the second health service provider key thus preferably comprise an asymmetric cryptographic key pair.

In accordance with a further embodiment of the invention, the second health service provider key is retrieved from an external database or is read from a local database. In other words, this means that preferably a simplified signature check involves accessing an appropriate database from which it is possible to read from a list of health service provider keys that key which is associated with the doctor who has previously signed the electronic prescription.

In accordance with a further embodiment of the invention, the method also comprises the step of authentication of the mobile telecommunication appliance, wherein the authentication is effected using a challenge-response method.

In accordance with a further embodiment of the invention the method also comprises the step of registration of the mobile telecommunication appliance on the data processing system, wherein the registration of the mobile telecommunication appliance on the data processing system involves user authentication to the mobile telecommunication appliance, wherein the data object key encrypted with the first health card key is sent to the mobile telecommunication appliance only when the user identification has been verified by the mobile telecommunication appliance. This ensures that unauthorized use of the electronic health card implemented in the mobile telecommunication appliance can be prevented. By way of example, it is therefore not sufficient merely to possess the mobile telecommunication appliance in order to redeem the electronic prescription. On the contrary, it is also necessary to know a specific user identification which needs to be additionally input either on the mobile telecommunication appliance itself or on the data processing system in order to release the electronic prescription. If the user identification is input on the data processing system, the user authentication involves the user identification for the mobile telecommunication appliance being transmitted to the mobile telecommunication appliance by means of a secured data transmission.

In accordance with one embodiment of the invention, the registration also involves the data processing system performing the steps of receiving the user identification, retrieving a registration key and sending the user identification to the mobile telecommunication appliance, wherein the user identification is encrypted with the registration key. By way of example, the registration key is the first health card key, wherein the registration involves an explicit health card identifier being received from the mobile telecommunication appliance, wherein the first health card key is associated with the explicit health card identifier of the mobile telecommunication appliance. The step of receiving the explicit health card identifier is therefore necessary in order for the first health card key to be able to be read from a central database using the health card identifier. Alternatively, it is also possible for the first health card key to be stored on the mobile telecommunication appliance itself, so that the first health card key can be transmitted to the data processing system in plain text during the registration of the mobile telecommunication appliance on the data processing system. In this case, the additional transmission of the explicit health card identifier to the data processing system is not necessary.

The use of the first health card key as a registration key has the advantage that it ensures an even higher level of certainty that the electronic health card implemented in the mobile telecommunication appliance is authentic. This is because exclusively the electronic health card is able to correctly decrypt the user identification encrypted with the first health card key so as, in this case too, to communicate the successful decryption to the data processing system in connection with a challenge-response method, for example.

As an alternative to the use of the first health card key in order to encrypt the user identification, it is naturally also possible to instruct the mobile telecommunication appliance to produce an asymmetric cryptographic key pair and to send a key for this key pair to the data processing system, whereupon the latter encrypts the user identification with this received key and transmits it back to the mobile telecommunication appliance. In this case too, exclusively the mobile telecommunication appliance is able to decrypt the user identification using the other portion of the asymmetric key pair and hence to authorize the redemption of the electronic prescription. However, it should be taken into account in this context that this requires further system resources of the mobile telecommunication appliance, since first of all the asymmetric key pair needs to be produced.

In accordance with one embodiment of the invention, the user identification is a biometric feature, such as a fingerprint, etc.

In accordance with one embodiment of the invention, the secure communication channel is preferably set up using end-to-end encryption. In this case, the secure communication channel is set up from the mobile telecommunication appliance using a communication link, wherein the communication link is received on a contact address for the data processing system. In addition, the setup of the secure communication channel comprises the steps of receiving a contact address for the mobile telecommunication appliance from the mobile telecommunication appliance and sending the contact address of the data processing system to the contact address of the mobile telecommunication appliance in response to the reception of the contact address of the mobile telecommunication appliance.

In this case, it should be noted that preferably all communication between the data processing system and the mobile telecommunication appliance takes place wirelessly, that is to say using Bluetooth, infrared or else using GSM, GPRS, UMTS and further mobile radio links, for example.

It is thus possible, by way of example, for the initiating data interchange comprising the interchange of appropriate contact addresses to be effected using short range communication, such as Bluetooth, etc., whereas the actual setup of the secure communication channel is effected using a mobile telecommunication link, such as UMTS.

In this context, in the case of the data processing system, a contact address is understood to mean a telephone number for the data processing system, for example, which can be used to set up a connection to the data processing system. Alternatively, or in addition, it is also possible for the contact address to comprise an IP address for the data processing system. In the case of short range communication, the contact address of the data processing system may also be understood to mean a specific identifier which can be used to identify the data processing system, for example via Bluetooth.

In the case of the mobile telecommunication appliance, the contact address is likewise understood to mean a telephone number for the mobile telecommunication appliance, for example. In the case of short range communication, the contact address of the mobile telecommunication appliance may likewise be understood to mean a specific identifier which can be used to identify the mobile telecommunication appliance, for example via Bluetooth.

In accordance with one embodiment of the invention, the communication link is received from the data processing system via a central server. In this case, the communication with the central server is preferably effected via the Internet. By way of example, in this case it is possible for a patient to use his mobile telecommunication appliance to call a centrally allocated telephone number in order to make contact with said server via a mobile telecommunication link. In this case, a toll-free central dial-up number, in particular, could be made available nationwide which the patient can easily commit to memory as a universal dial-up number for redeeming electronic prescriptions, for example.

As soon as the patient has dialed up to the server, he transmits a process identifier to the central server, this process identifier being explicitly associated with the data processing system. The association between the process identifier and the data processing system means that the server is now able to forward, that is to say to route, the connection received from the telecommunication appliance to the relevant pharmacy information system. As a result, a communication link has been set up between the data processing system and the mobile telecommunication appliance in an uncomplicated fashion.

In accordance with one embodiment of the invention, the method also comprises the step of retrieving the encrypted medical data object and the signature associated with the medical data object and the data object key which is associated with the medical data object and which is encrypted with the first health card key from an external prescription database, wherein the retrieval is effected using the explicit health card identifier.

In a further aspect, the invention relates to a computer program product having instructions which can be executed by a processor for the purpose of performing the method steps of the method according to the invention for the decryption of a medical data object.

In a further aspect, the invention relates to a data processing system having means for performing the method steps of the method according to the invention for the decryption of a medical data object. By way of example, as already stated above, the data processing system in this case is a doctor information system or a hospital information system or a pharmacy information system. Alternatively, the data processing system may also be a connector. A connector is designed to set up the communication between electronic health card, doctor or pharmacy information system and telematics infrastructure, such as a prescription server.

In a further aspect, the invention relates to a method for the decryption of an encrypted data object key, wherein the decryption is effected by a mobile communication appliance.

In a further aspect, the invention relates to a method for the decryption of an encrypted data object key, wherein the decryption is effected by a mobile telecommunication appliance, wherein the telecommunication appliance is designed for use as an electronic health card, having the steps of setting up a secure communication channel to a data processing system of a health service provider, receiving the encrypted data object key from the data processing system, reading a second health card key from a protected memory of the telecommunication appliance, decrypting the data object key using the second health card key and sending the decrypted data object key to the data processing system.

In a further aspect, the invention relates to a computer program product having instructions which can be executed via a processor for the purpose of performing the method steps of the method according to the invention for the decryption of an encrypted data object key.

In a further aspect, the invention relates to a mobile telecommunication appliance having means for performing the method steps of the method according to the invention for the decryption of an encrypted data object key.

In a further aspect, the invention relates to a method for the decryption of a medical data object, wherein the medical data object is encrypted with a data object key, wherein the medical data object has, associated with it, a signature and a data object key encrypted with a first health card key, wherein the medical data object is associated with the first health card key. As already mentioned above, the signature may be encrypted together with the medical data object, or the signature may be in the form of a separate file in addition to the encrypted medical data object and the encrypted data object key.

The method according to the invention contains the steps of a secure communication channel being set up between a data processing system of a health service provider and the mobile telecommunication appliance, wherein the telecommunication appliance is designed for use as an electronic health card, wherein the first health card key is associated with the mobile telecommunication appliance. The further step of the method comprises the data object key encrypted with the first health card key being sent to the telecommunication appliance by the data processing system and the step of the encrypted data object key being encrypted by the mobile telecommunication appliance, wherein the decryption is effected using a second health card key, wherein the first and second health card keys form an asymmetric cryptographic key pair. Finally, the decrypted data object key is sent from the telecommunication appliance to the data processing system and is followed by the medical data object being decrypted with the decrypted data object key by the data processing system.

Figure 2:
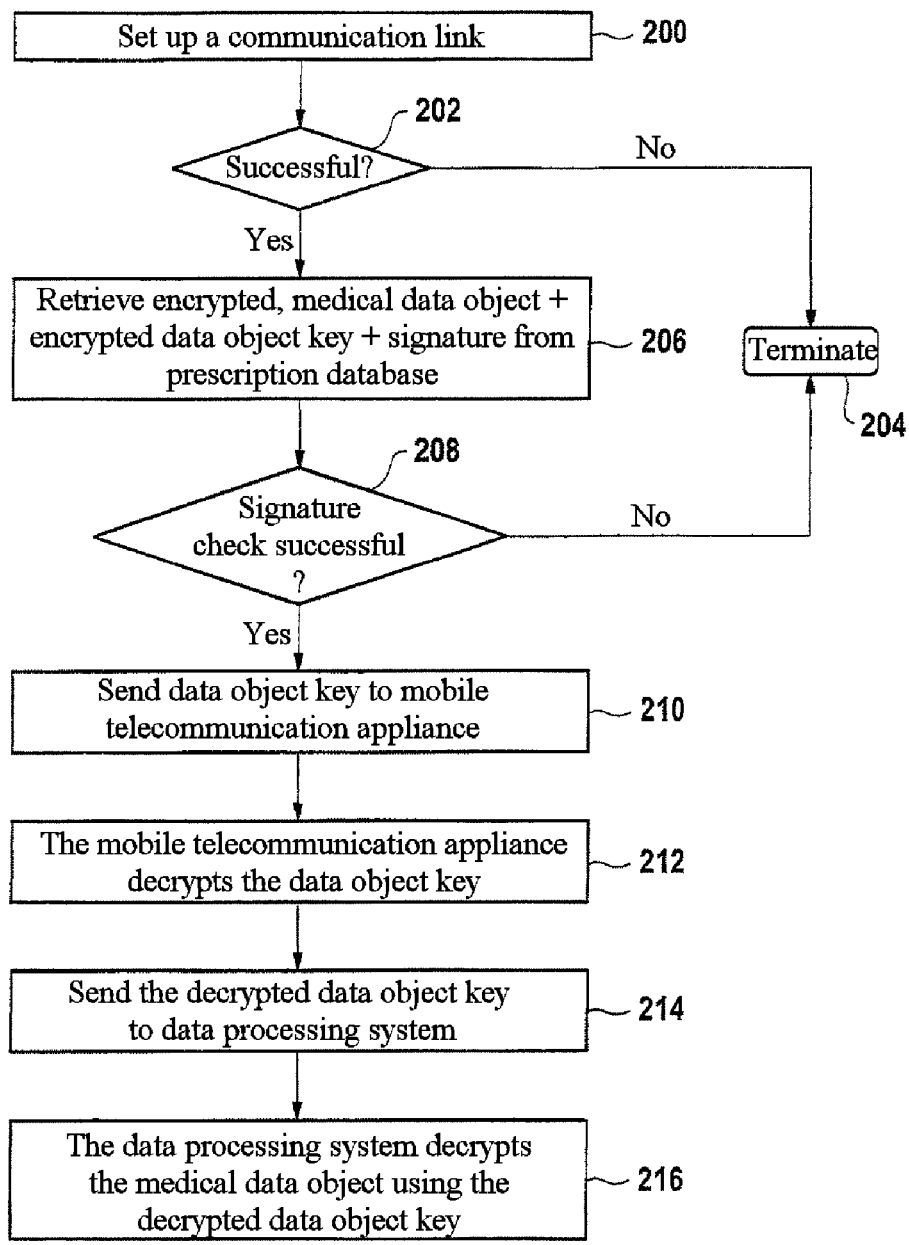
Figure 3A:
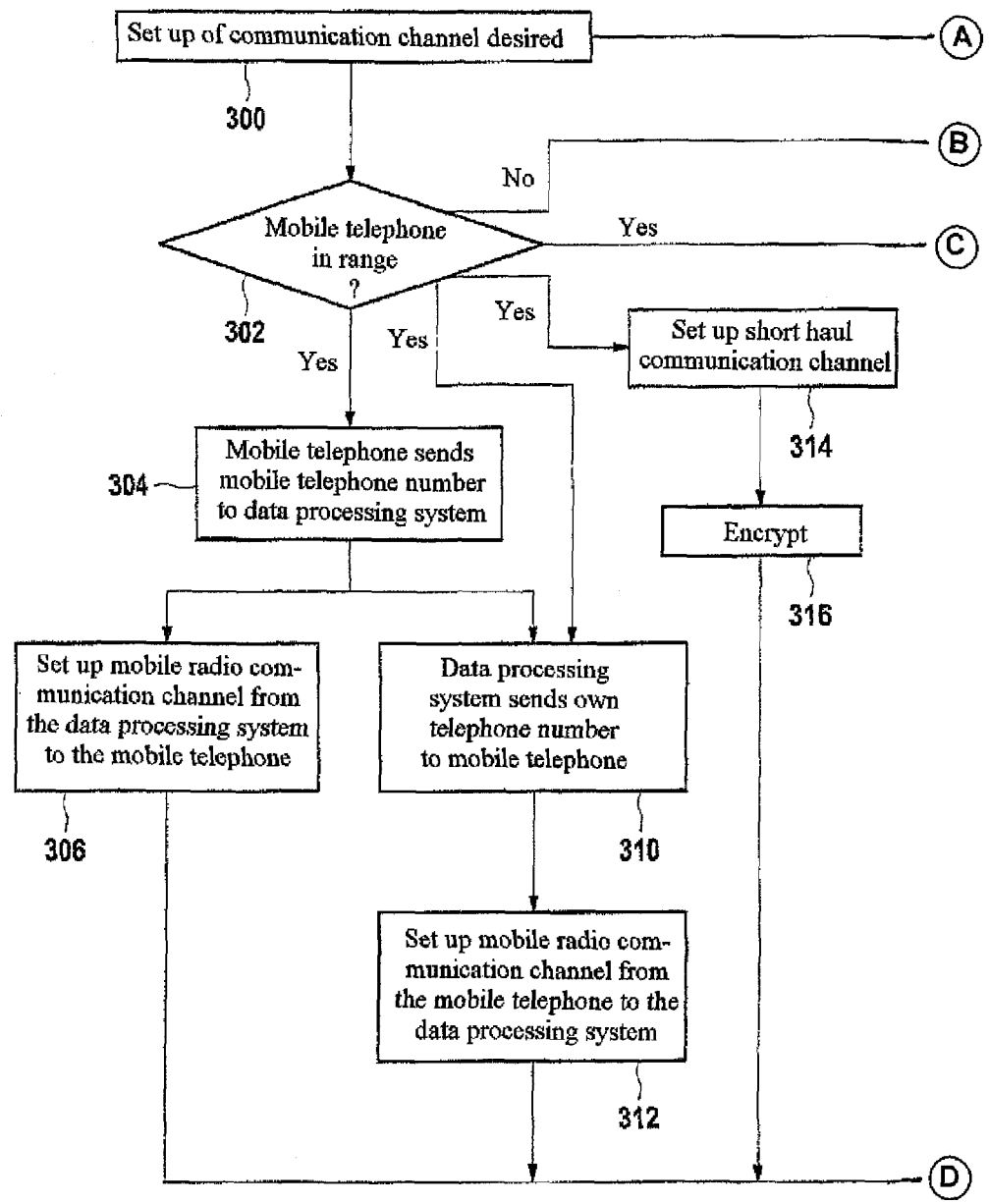
Figure 3B:
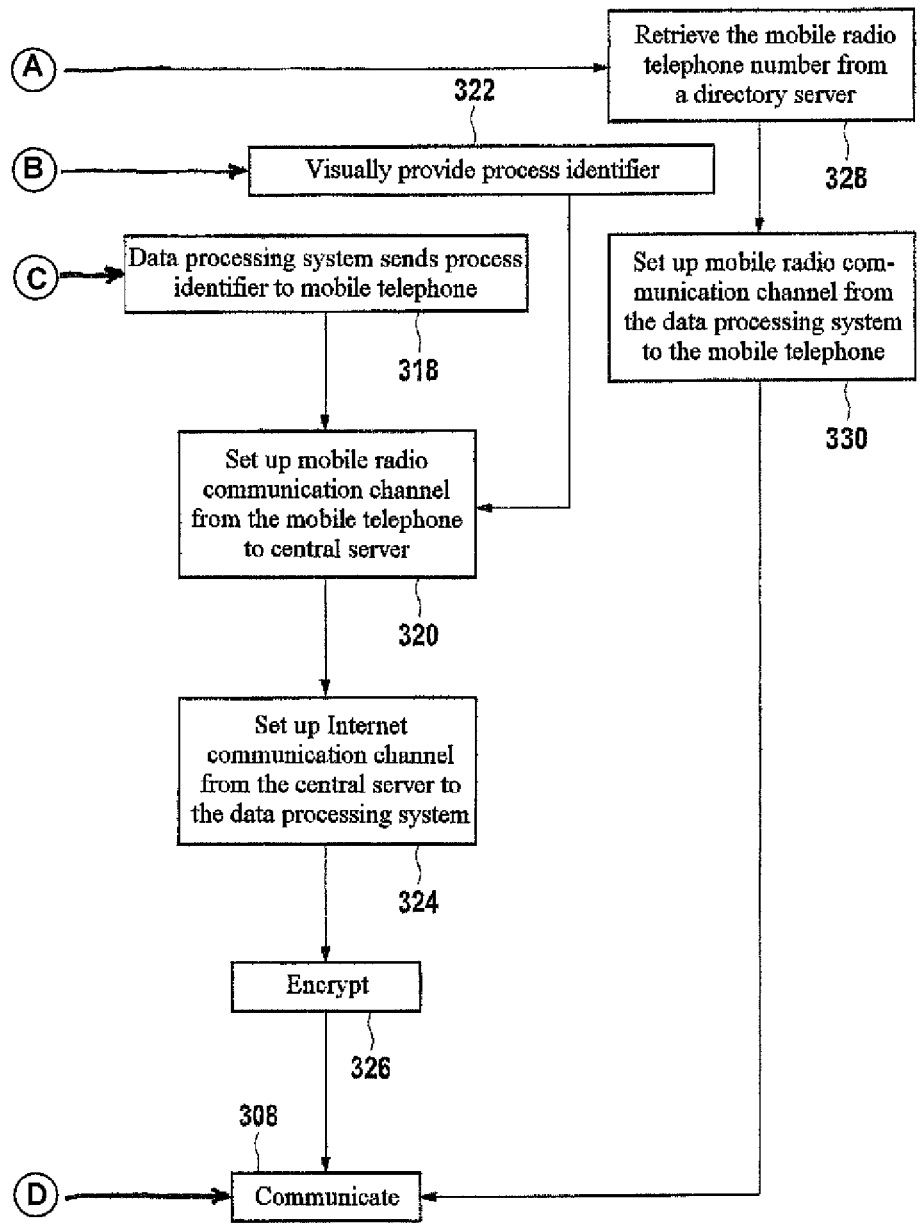

Embodiments of the invention are explained in more detail below with reference to the drawings, in which:

FIG. 1 shows a block diagram of a data processing system for requesting prescription data using an electronic patient card integrated in a mobile telecommunication appliance, FIG. 2 shows a flowchart of a method for decrypting prescription data, FIGS. 3A and 3B show a flowchart of a method for setting up a communication channel between a data processing system and a mobile telecommunication appliance, and FIG. 4 shows a flowchart of a method for user authentication for the decryption of prescription data.

FIG. 1 shows a block diagram of a data processing system 100 for requesting prescription data using an electronic patient card integrated in a mobile telecommunication appliance 116.

The data processing system comprises a memory 102 and a processor 104. The memory contains, inter alia, a computer program 110 which contains instructions which can be executed by the processor 104 in order to perform the method according to the invention for the decryption of medical data objects. In addition, the program 110 is used for controlling all the data interchange processes which the method according to the invention entails. In addition, the data processing system 100 has input means 105 and an interface 106. By way of example, the input means 105 may be a keyboard or a mouse, but it is also possible to use a fingerprint or iris scanner or the like. Furthermore, the data processing system has output means 109, such as a printer, a display unit such as a screen, etc.

The mobile telecommunication appliance 116, which is designed for use as an electronic health card, likewise has a processor 124 and a memory 118. The memory 118 contains, inter alia, a computer program product 119 with instructions which can be executed by the processor 124 in order to perform all the data interchange operations of the method for the decryption of data object keys, and the decryption process itself.

The text below will now show the interaction of the data processing system 100 and the mobile telecommunication appliance 116 by way of example when the mobile telecommunication appliance 116 is intended to be used to redeem an electronic prescription. In this case, the data processing system 100 is a pharmacy information system and the mobile telecommunication appliance 116 is a mobile telephone of a patient.

In this context, the embodiment which follows is merely intended to be understood as one option among many for implementing the communication between mobile telephone 116 and pharmacy information system 100. By way of example, a patient now goes into a pharmacy with his mobile telephone 116 in order to redeem an electronic prescription. To this end, the patient uses his mobile telephone to dial the telephone number of an exchange server 128. In this case, the communication between the mobile telephone 116 and the exchange server 128 is conducted via a mobile telecommunication link 113, such as a GPRS link. When the connection between the exchange server 128 and the mobile telecommunication appliance 116 has been set up, the patient is asked to transmit an explicit process identifier to the exchange server 128. By way of example, this process identifier may be a number for the pharmacy, the pharmacy name or another explicit tag for the pharmacy, followed by a process number allocated by the pharmacy specifically for this process.

In the present embodiment in FIG. 1, the pharmacy ABC has an associated IP address 123.456.789 in a database table of the exchange server 128, for example. The exchange server 128 then sets up an internet connection 115 to the data processing system 100 via the network 114 and at the same time notifies the data processing system 100 of the explicit process identifier, which now also contains the serial individually allocated process number which was previously communicated to the patient. By way of example, the pharmacy with the name ABC might previously have notified the patient: "to redeem the prescription, use process number 123". The patient has then used his mobile telecommunication appliance to communicate to the exchange server 128 "pharmacy ABC process number 123". In this way, a telecommunication link can now be set up between the data processing system 100 and the mobile telecommunication appliance 116 using the central exchange server 128. In this case, it is important for this connection between the data processing system 100 and the mobile telecommunication appliance 116 to be an uninterceptable secured and hence encrypted connection. In the case of a mobile radio link between the exchange server 128 and the mobile telecommunication appliance 116, there is already heavy encryption usually on the basis of the prior art, e.g. in the case of GSM and UMTS. However, this does not apply to the encryption of the data transmission between the exchange server 128 and the data processing system 100 via the network 114, such as the Internet. In this case, care should be taken to ensure that appropriate encryption techniques reliably prevent interception of the communication.

It should be pointed out that preferably the communication between the data processing system 100 and the mobile telecommunication appliance 116 can also be implemented directly via a direct wireless short range connection 112, such as a Bluetooth or infrared link, instead of using the exchange server 128. In this case too, it is necessary to ensure that an uninterceptable connection is made.

When the communication link has been set up either directly or indirectly via the exchange server 128, the health card identifier 122, which is stored in the memory 118 of the mobile telecommunication appliance 116, is transmitted to the data processing system 100. Using this health card identifier 122, the data processing system 100 asks an external prescription database 134 whether electronic prescriptions are provided for this health card identifier 122. In the present case in FIG. 1, the prescription database 134 contains an encrypted medical data object 132, with which an appropriate data object key and a signature of a treating doctor are associated, for the health card identifier 122. If the patient now wishes to redeem this very prescription, the encrypted medical data object 132, the associated data object key and the signature are transmitted to the data processing system 100 via the network 114.

In the present case, the medical data object is encrypted with a data object key, this being a symmetric key. The data object key itself is in encrypted form, wherein it is encrypted with a first health card key 138. This first health card key 138 is a public key which, by way of example, is held in a central external database of a trust center 136 and can be retrieved. In order to encrypt a medical data object, a doctor's practice therefore merely needs to produce a random symmetric key, this key then being used to encrypt the medical data object. The randomly produced symmetric key itself is encrypted with the first health card key 138. The first health card key 138 is a portion of an asymmetric key pair, wherein the other portion of the asymmetric key pair is the second health card key 120, which is stored in non-readable form in the memory 118 of the mobile telephone communication appliance 116.

Thus, in order to perform decryption of the encrypted medical data object, the encrypted data object key must now first of all be decrypted by the mobile telecommunication appliance 116. To this end, the data processing system 100, as already mentioned above, now reads the encrypted medical data object 132, the encrypted data object key and the signature from the prescription database 134 and loads them into the data processing system 100. The data processing system 100 uses the secured communication channel which has been set up to send the encrypted data object key to the mobile telecommunication appliance 116, which is able to use the second health card key 120 to decrypt the encrypted data object key. The decrypted data object key is then likewise transmitted via the communication link back to the data processing system 100, which is now able to decrypt the encrypted medical data object.

At the same time, the data processing system 100 is in this case also intended to perform a signature check. Typically, the signature of the medical data object is a hash value for the medical data object, which hash value has been encrypted with a nonpublic first health service provider key, that is to say the private key of a doctor. In order to check the signature, a hash value is in turn formed from the medical data object and is then compared with the hash value which is obtained through decryption of the signature with the second health service provider key 113. The second health server provider key 114 is in turn stored at the Trust Center 136 in the database thereof.

At this juncture, it should again be pointed out that the signature can be formed either from the medical data object or from the encrypted medical data object. Accordingly, the signature check also needs to be adapted.

Following verification of the signature and successful decryption of the medical data object, a patient is now able to redeem the electronic prescription.

All communications by the data processing system 100 are routed via the interface 106. All communications by the mobile telecommunication appliance 116 are routed via the interface 126.

FIG. 2 now shows a rough overview of the method for the decryption of the prescription data. In step 200, a communication link is set up between the mobile telecommunication appliance and the data processing system. If this setup of the communication link is not successful in step 202, the decryption method is terminated in step 204. If, by contrast, the setup of the communication link is successful in step 202, the encrypted medical data object, the encrypted data object key and the signature are then retrieved from an external prescription database in step 206. Preferably, a signature check then takes place in the subsequent step 208, said signature check likewise resulting in termination of the decryption method in step 204 if verification is unsuccessful.

If, by contrast, the signature check is successful in step 208, the encrypted data object key is sent to the mobile telecommunication appliance in step 210. In step 212, the mobile telecommunication appliance then decrypts the data object key using the private health card key and, in step 214, transmits the decrypted data object key back to the data processing system. Finally, in step 216, the medical data object is decrypted using the decrypted data object key by the data processing system itself.

The detailed process of the setup of the communication link, as indicated in step 200, is described in detail in FIGS. 3A and 3B.

FIGS. 3A and 3B show a flowchart of a method for setting up a communication channel between a data processing system of a health service provider and a mobile telecommunication appliance of a patient, wherein the mobile telecommunication appliance is designed for use as an electronic health card. If, as FIGS. 3A and 3B show, setup of a communication channel is now desired in step 300, there are a very wide variety of options for how such communication channel setup can be implemented. By way of example, a check is performed in step 302 to determine whether the mobile telephone is in range, so that a short range connection can be set up, for example using Bluetooth, between the data processing system and the mobile communication appliance.

If the mobile telephone is in range in step 302, there are several options for how to proceed. For example, the mobile telephone can transmit its own mobile telephone number in step 304 to the data processing system using the short range connection, so that a mobile radio communication channel can then be set up in step 306 from the data processing system to the mobile telephone on the mobile telephone number of the latter. The communication between the mobile telecommunication appliance and the data processing system then takes place in step 308. Alternatively, however, it is also possible, after step 304, to send the data processing system's own telephone number to the previously transmitted mobile telephone number from the data processing system using the short range connection. This is indicated in step 310. A mobile radio communication channel is then set up from the mobile telephone to the data processing system in step 312, wherein the mobile telephone dials the telephone number indicated by the data processing system. The setup of the mobile radio communication channel from the mobile telephone to the data processing system is shown in step 312, and after step 312 the communication is then in turn effected with step 308.

As an alternative to the use of steps 304, 306, 310 and 312, it is also sufficient, if step 302 has detected that the mobile telephone is in range, for step 302 to be followed directly by the execution of step 310, for example, in which the data processing system transmits its own telephone number to the mobile telephone. In this case, this transmission can also be effected simply by using the short range connection. The mobile telephone then calls the indicated telephone number, so that the communication between the data processing system and the mobile telephone can take place in step 308.

A further alternative involves accomplishing the whole communication between the mobile telephone and the data processing system exclusively using the short range communication channel. This is shown using steps 314 and 316, for example. If the mobile telephone is in range in step 302, for example, so that a short range communication link can be set up, the setup of a short range communication channel between the data processing system and the mobile telephone takes place in step 314. In this case, however, it is necessary for encryption to be additionally performed in step 316, since short range communication is usually effected in unencrypted form. Following step 316, the communication in step 308 takes place between the data processing system and the mobile telecommunication appliance.

Two further aspects should also be discussed at this juncture. Firstly, this relates to the encryption when the mobile radio communication channel is used between the data processing system and the mobile telephone: if a mobile radio communication channel is used for communication, further data encryption is not absolutely necessary. Nowadays, mobile radio communication links are already highly encrypted, which means that the implementation of further encryption algorithms in the mobile telephone is therefore not necessary, which helps to reduce system resource consumption in the mobile telephone.

Secondly, this relates to the use of the short range communication for transmitting the telephone numbers between the data processing system and the mobile telephone. If a telephone number for the data processing system and possibly even a process number for communication are transmitted from the data processing system to the telephone number of the mobile telephone in step 310, e.g. using a short message SMS, this ensures that distinctly exclusively the holder of this mobile telephone receives this message. A telephone number for a mobile telephone is already so comprehensively personalized that spying-out of process identifiers by third parties is thereby rendered impossible. No further encryption mechanisms are required for initializing the communication in this case either, since, as already noted above, all mobile radio communications are already performed with a high level of encryption as standard.

At this juncture, it should be pointed out that FIGS. 3A and 3B do not explicitly show the sending of a communication request by the mobile telephone to the data processing system. This communication request can be seen by way of example in step 302, however.

A further alternative to the setup of the communication channel in the event of the mobile telephone being in range in step 302 involves using the short range communication to transmit a process identifier to the mobile telephone, for example. This is indicated in step 318 with the transmission of the processing identifier to the mobile telephone by the data processing system. In step 320, the mobile telephone then sets up a mobile radio communication channel to a central server, e.g. using a central dial-up number. On the basis of the transmitted process identifier, which is additionally transmitted from the mobile telephone to the central server when the communication channel is set up, the server is now able in step 324 to set up an internet communication channel from the central server to the relevant data processing system determined by the process identifier, that is to say to the pharmacy information system. When this has been done in step 324, the use of the Internet means that further encryption of the data interchange is necessary in step 326, however. In this case, this is because the data interchange takes place between mobile telephone, server and data processing system, as already described in detail in FIG. 1. This corresponds to the communication as shown in step 308.

However, steps 320, 324, 326 and subsequently 308 can also be performed when the mobile telephone is not in short range range. The reason is that step 302 establishes that the mobile telephone is outside of the range for performing short range communication, or if the mobile telephone is not equipped for short range communication, it is also possible to provide the process identifier visually on the data processing system itself. This is outlined in step 322. In this case, the patient manually inputs the presented process identifier when the mobile radio communication channel to the central server is set up, so that finally steps 320, 324, 326 and 308 can then be performed.

However another possibility is that, if the mobile telephone is outside of the range for performing short range communication, the mobile telephone performs or prompts performance of a physical position determination. If the mobile telephone is equipped with a GPS receiver, the mobile telephone is able to send the most recently recorded position coordinates as a process identifier to the central server, which can use an available table to attribute the pharmacy associated with these coordinates and hence the relevant data processing system of the pharmacy. The server can then set up a secure communication link between the mobile telephone and the data processing system with which these coordinates are associated.

If the mobile telephone is not equipped with a GPS receiver, such position determination can also be performed using the current mobile radio cell in which the mobile telephone is situated at that instant. This is thus mobile-radio-network-based position determination. In this case, the server has a table in which each mobile radio cell has an associated pharmacy situated therein and the data processing system address (e.g. IP address) of said pharmacy. In this case too, the server can then set up a secure communication link between the mobile telephone and the data processing system with which the mobile radio cell coordinates are associated.

A further alternative for setting up a communication channel involves the directory server outlined in FIG. 1 being used to set up a communication link from the data processing system to the mobile telephone. In this case, a pharmacist, for example, inputs the health card identifier of the patient into his system and transmits this health card identifier to the exchange server. The exchange server reads from its database the mobile telephone number stored for the health card identifier and returns said mobile telephone number to the data processing system. In this case, retrieval of the mobile telephone number from a directory server in step 328, as shown in FIGS. 3A and 3B, is followed by step 330 with the setup of a mobile radio communication channel from the data processing system to the mobile telephone, followed by subsequent communication between the data processing system and the mobile telephone in step 308. Alternatively, it is also possible for the directory server to use the stored mobile telephone number to set up a telecommunication link to the mobile telephone directly, so that in this case communication takes place between the data processing system, the directory server and the mobile telephone.

In further alternative, which is not illustrated in FIGS. 3A and 3B, it is also possible for a direct communication link to be set up from the mobile telephone to the data processing system by virtue of a patient directly dialing the telephone number of the data processing system manually. The same also applies in the opposite direction—a pharmacist sets up the direct communication link to the mobile telephone of the patient by inputting and dialing the number of the patient's mobile telephone on the data processing system manually.

As already mentioned above, all communications require spying-out of data to be reliably prevented. However, this also requires reliable user authentication, so that abuse of prescription data or abuse of the electronic health card integrated in the mobile telephone is prevented.

Preferably, the communication between the mobile telephone and the data processing system is initiated by the mobile telephone, for example by virtue of a communication request being transmitted to the data processing system in step 302. All further subsequent steps for setting up the communication channel can then be performed fully automatically by the mobile telephone and the data processing system.

In this regard, FIG. 4 illustrates a flowchart of a method for user authentication for the decryption of prescription data. In this case, step 300, the setup of the communication, corresponds to the method discussed previously in FIGS. 3A and 3B.

Thus, after communication between the mobile telephone and the data processing system has been set up in step 400, a patient can then authenticate himself in this respect by inputting an appropriate identification, e.g. a PIN, into his mobile telephone in step 426 so as to authorize the use of the electronic health card. Step 426 is followed by step 412, in which a check is performed to determine whether the user identification has been verified by the mobile telephone. If this is not the case, step 412 is followed by step 418, termination of the authorization method.

If the user has been authenticated to the mobile telephone in step 412, however, an optional challenge-response method is performed in step 414. This involves verifying whether the electronic health card contained in the mobile telephone is actually eligible for redeeming an electronic prescription available on the pharmacy information system. An example of how this challenge-response method might be performed is provided, by way of example, by virtue of the pharmacy information system (data processing system) producing a random number and encrypting it with the public health card key (FIG. 1: first health card key 128). The encrypted random number is then transmitted to the mobile telephone, whereupon the mobile telephone uses its private health card key, which only it knows, to decrypt this random number again. The mobile telephone then transmits the decrypted random number in plain text back to the data processing system. If the returned random number matches the random number previously produced by the data processing system, there is the assurance that communication is with an eligible mobile telephone and hence an eligible electronic health card.

If, after step 414, the challenge-response method, the electronic health card's authorization to redeem the electronic prescription is not verified in step 416, the process for user authentication is in turn terminated after step 416 in step 418. If successful verification has been performed in step 416, however, data interchange between the data processing system and the mobile telecommunication appliance is possible in step 420.

A further alternative after communication has been set up in step 400 between the data processing system and the mobile telecommunication appliance is provided by the input of the user identification on the data processing system itself. This is shown in step 402. Following step 402, a registration key pair can then be produced by the mobile telephone in step 404 in order to ensure uninterceptable transmission of the user identification to the mobile telecommunication appliance. In step 406, the mobile telephone sends a first registration key from the registration key pair to the data processing system. In step 408, the data processing system then encrypts the input user identification with the first registration key and transmits it back to the mobile telephone in step 410. Following step 410, a verification check is then performed in turn in step 412. In this case too, only the mobile telephone is again able to decrypt the user identification encrypted with the first registration key, namely using the second registration key associated with the registration key pair. In this case, the first and second registration keys are preferably an asymmetric cryptographic key pair. Step 412 is in turn followed by steps 414 of the challenge-response method, steps 416, 418 and 420, as already described above.

An alternative to steps 404 to 408 following input of the user identification on the data processing system in step 402 is also reading the public health card key of the health card in step 422. This is followed in step 424 by the encryption of the user identification with this read public health card key, whereupon the encrypted user identification is in turn sent to the mobile telephone in step 410. Since only the mobile telephone is in possession of the private health card key, it is also only the mobile telephone which is able to verify the user identification. Step 412 is likewise followed by the performance of steps 414 to 420, as described above.

LIST OF REFERENCE SYMBOLS

100 Data processing system
102 Memory
104 Processor
105 Input means
106 Interface
109 Output means
110 Program
112 Communication channel
113 Communication channel
114 Network
115 Communication channel
116 Mobile telecommunication appliance
118 Memory
119 Computer program product
120 Second health card key
122 Health card identifier
124 Processor
126 Interface
128 Exchange server
132 Encrypted medial data object
134 Prescription database
136 Database
138 First health card key
140 Second health service provider key

What is claimed is:

1. A method for decryption of a medical data object, wherein the medical data object is encrypted with a data object key, wherein the medical data object has, associated with it, a signature and the data object key encrypted with a first health card key,
wherein the medical data object is associated with the first health card key, having the following steps:
a secure communication link is set up between a data processing system and a mobile telecommunication appliance, wherein the mobile telecommunication appliance is designed for use as an electronic health card, wherein the first health card key is associated with the mobile telecommunication appliance, and wherein the data processing system is a pharmacy information system,
the data object key encrypted with the first health card key is sent to the mobile telecommunication appliance by the data processing system,
the encrypted data object key is decrypted by the mobile telecommunication appliance, wherein the decryption is effected using a second health card key, wherein the first and second health card keys form an asymmetric cryptographic key pair,
decrypted data object key is sent from the mobile telecommunication appliance to the data processing system,
the medical data object is decrypted with the decrypted data object key by the data processing system, wherein a pharmacy fills a prescription for a holder of the mobile telecommunication appliance through use of the decrypted medical data object of the pharmacy information system,
wherein the method also comprises the step of registration of the mobile telecommunication appliance on the data processing system, wherein the registration of the mobile telecommunication appliance on the data processing system involves user authentication to the mobile telecommunication appliance, wherein the data object key encrypted with the first health card key is sent to the mobile telecommunication appliance only when the user identification has been verified by the mobile telecommunication appliance, wherein the registration involves the following steps being performed by the data processing system:
a user identification is received,
the user identification is sent to the mobile telecommunication appliance,
wherein the user identification is encrypted with the first health card key,
wherein the registration involves the following steps being performed by the mobile telecommunication appliance
the user identification is received from the data processing system, wherein the user identification is encrypted, the encrypted user identification is decrypted with the second health card key.

2. A method for decryption of a medical data object by a data processing system, wherein the medical data object is encrypted with a data object key, wherein the medical data object has, associated with it, a signature and the data object key encrypted with a first health card key, and wherein the data processing system is a pharmacy information system,
wherein the medical data object is associated with the first health card key, having the following steps:
a secure communication link is set up to a mobile telecommunication appliance, wherein the telecommunication appliance is designed for use as an electronic health card, wherein the first health card key is associated with the mobile telecommunication appliance,
the data object key encrypted with the first health card key is sent to the mobile telecommunication appliance,
after the data object key has been decrypted by the telecommunication appliance resulting in a decrypted data object key, the decrypted data object key is received from the telecommunication appliance,
the medical data object is decrypted with the decrypted data object key, wherein a pharmacy fills a prescription for a holder of the mobile telecommunication appliance through use of the decrypted medical data object of the pharmacy information system,
wherein the method also comprises the step of registration of the mobile telecommunication appliance on the data processing system, wherein the registration of the mobile telecommunication appliance on the data processing system involves user authentication to the mobile telecommunication appliance, wherein the data object key encrypted with the first health card key is sent to the mobile telecommunication appliance only when a user identification has been verified by the mobile telecommunication appliance, wherein the registration involves the following steps being performed by the data processing system:
the user identification is received,
the user identification is sent to the mobile telecommunication appliance, wherein the user identification is encrypted with the first health card key.

3. The method as claimed in claim 2, wherein a registration key is retrieved from the mobile telecommunication appliance or wherein the registration involves an explicit health card identifier being received from the mobile telecommunication appliance and the first health card key being retrieved from an external database using the explicit health card identifier.

4. The method as claimed in claim 3, wherein the secure communication link is set up using the following steps:
a communication request is received from the mobile telecommunication appliance,
a contact address for the data processing system is sent to the mobile telecommunication appliance in response to the communication request,
the communication link to the mobile telecommunication appliance is set up using the contact address of the data processing system.

5. The method as claimed in claim 3, wherein the secure communication link is set up using the following steps:
a communication request is received from the mobile telecommunication appliance,
a process identifier is sent to the mobile telecommunication appliance, wherein the process identifier is explicitly associated with the data processing system,
the communication link to the mobile telecommunication appliance is set up via a central server.

6. The method as claimed in claim 3, wherein the secure communication link is set up using the following steps:
a communication request is received from the mobile telecommunication appliance, wherein the communication request comprises a contact address for the mobile telecommunication appliance,
the communication link to the mobile telecommunication appliance is set up using the contact address of the mobile telecommunication appliance.

7. The method as claimed in claim 3, wherein the secure communication link is set up using the following steps:
a communication request is received from the mobile telecommunication appliance,
the communication link to the mobile telecommunication appliance is set up in response to the reception of the contact address of the mobile telecommunication appliance, wherein the communication request is received and the communication link is set up using a short range connection.

8. The method as claimed in claim 3, also having the step of the encrypted medical data object and the signature associated with the medical data object and the data object key which is associated with the medical data object and which is encrypted with the first health card key being retrieved from a prescription database, wherein the retrieval is performed using the explicit health card identifier.

9. A method for decryption of an encrypted data object key, wherein the decryption is performed by a mobile telecommunication appliance,
wherein the mobile telecommunication appliance is designed for use as an electronic health card, having the following steps:
a secure communication channel is set up to a data processing system of a health service provider, wherein the health service provider is a pharmacy information system,
the encrypted data object key is received from the data processing system,
a second health card key is read from a memory in the mobile telecommunication appliance,
the data object key is decrypted using the second health card key,
the decrypted data object key is sent to the data processing system,
an encrypted medical data object is decrypted by the decrypted data object key,
the decrypted medical data object is received by the pharmacy information system,
a pharmacy fills a prescription for a holder of the mobile telecommunication appliance through use of the decrypted medical data object of the pharmacy information system,
wherein the method also comprises the step of registration of the mobile telecommunication appliance on the data processing system, wherein the registration of the mobile telecommunication appliance on the data processing system involves user authentication to the mobile telecommunication appliance, wherein the encrypted data object key is decrypted only when the user identification has been verified, wherein the registration involves the following steps being performed by the mobile telecommunication appliance:
the user identification is received from the data processing system, wherein the user identification is encrypted, the encrypted user identification is decrypted with the second health card key.

10. The method as claimed in claim 2, wherein:
the user identification is associated with a user; and
the medical data object is transmitted to the data processing system in response to the data processing system transmitting the user identification or another identification of the user to a holder of the medical data object.

11. The method as claimed in claim 2, wherein the medical data object is transmitted to the data processing system in response to mobile telecommunication appliance sending to a holder of the medical data object a process identifier identifying the data processing system.

12. The method as claimed in claim 2, wherein the user identification identifies a user of the mobile telecommunication appliance.

13. The method as claimed in claim 12, further comprising sending the user identification from the mobile telecommunication appliance to the data processing system.

14. The method as claimed in claim 10 wherein the step of registering the mobile telecommunication appliance with the data processing system is performed each time a medical data object is transmitted to the data processing system wherein a data object key encrypting the medical data object is to be decrypted by the mobile telecommunication appliance.

15. A pharmacy information system comprising:
memory to store a medical data object encrypted with a data object key, wherein the medical data object has associated with it a signature and the data object key encrypted with a first health card key and wherein the medical data object is associated with the first health card key;
a processor;
a communications module; and
a cryptographic module, wherein:
the communications module is to:
set up a secure communication link to a mobile telecommunication appliance;
to transmit user authentication to the mobile telecommunication appliance, wherein the mobile telecommunication appliance is designed for use as an electronic health card, and wherein a first health card key is associated with the mobile telecommunication appliance and wherein the user authentication comprises user identification encrypted with the first health card key;
to send the data object key encrypted with the first health card key to the mobile telecommunication appliance, wherein the data object key is sent to the mobile telecommunication appliance only when the user identification has been verified by the mobile telecommunication appliance;
to receive the decrypted data object key from the telecommunication appliance after the data object key has been decrypted by the telecommunication appliance resulting in a decrypted data object key;
the processor is to register the mobile telecommunication appliance on the data processing system, the registration involving the receipt of the user identification by pharmacy information system and involving the sending of the user identification to the mobile telecommunication appliance; and
the cryptographic module is to decrypt the medical data object with the decrypted data object key, wherein a pharmacy is to fill a prescription for a holder of the mobile telecommunication appliance through use of the decrypted medical data object of the pharmacy information system.

* * * * *